United States Patent [19]
Juliano

[11] Patent Number: 6,104,011
[45] Date of Patent: Aug. 15, 2000

[54] SHEATHED THERMOCOUPLE WITH INTERNAL COILED WIRES

[75] Inventor: Rolando O. Juliano, Hannibal, Mo.

[73] Assignee: Watlow Electric Manufacturing Company, St. Louis, Mo.

[21] Appl. No.: 08/923,909

[22] Filed: Sep. 4, 1997

[51] Int. Cl.[7] .............................. H05B 3/44; G01K 7/00
[52] U.S. Cl. ............................................ 219/544; 374/179
[58] Field of Search .................................... 219/544, 546, 219/523, 328; 236/69, 68 B; 322/2 R; 136/200; 374/3

[56] References Cited

U.S. PATENT DOCUMENTS

| | | | |
|---|---|---|---|
| 2,473,627 | 6/1949 | Wickizer et al. ............................ | 136/4 |
| 3,132,517 | 5/1964 | Mettetal et al. ........................... | 73/359 |
| 3,317,353 | 5/1967 | Bingham .................................. | 136/233 |
| 3,353,260 | 11/1967 | Davis et al. .............................. | 29/573 |
| 3,582,616 | 6/1971 | Wrob ....................................... | 219/541 |
| 3,614,387 | 10/1971 | Wrob ....................................... | 219/328 |
| 3,816,182 | 6/1974 | McAdam ................................. | 136/230 |
| 3,867,205 | 2/1975 | Schley .................................... | 136/232 |
| 3,898,431 | 8/1975 | House et al. ............................ | 219/534 |
| 3,920,693 | 11/1975 | Beasley et al. .......................... | 219/523 |
| 4,039,778 | 8/1977 | Williams ................................. | 219/544 |
| 4,265,117 | 5/1981 | Thoma et al. ............................ | 73/359 |
| 4,278,828 | 7/1981 | Brixy et al. ............................. | 136/232 |
| 4,343,961 | 8/1982 | Norton .................................... | 136/230 |
| 4,416,623 | 11/1983 | Takahashi ................................ | 432/36 |
| 4,454,370 | 6/1984 | Voznick .................................. | 136/221 |
| 4,915,508 | 4/1990 | McCulloch et al. .................... | 374/166 |
| 5,142,901 | 9/1992 | Nagawa et al. ......................... | 73/73 |
| 5,232,517 | 8/1993 | Hilborn et al. ......................... | 136/233 |
| 5,485,542 | 1/1996 | Ericson .................................. | 392/474 |
| 5,527,111 | 6/1996 | Lysen et al. ............................ | 374/208 |
| 5,567,909 | 10/1996 | Sugarman et al. ..................... | 136/201 |
| 5,620,255 | 4/1997 | Cook, III ................................ | 374/141 |
| 5,711,608 | 1/1998 | Finney ................................... | 374/208 |

*Primary Examiner*—Teresa Walberg
*Assistant Examiner*—Daniel Robinson
*Attorney, Agent, or Firm*—Herzog, Crebs & McGhee, LLP

[57] ABSTRACT

A thermocouple with a tubular metallic sheath extending longitudinally about a sheath centerline; a first wire of a first material within the sheath and coiled about a first centerline lying parallel to the sheath centerline; a second wire of a second material within the sheath and coiled about a second centerline lying parallel to the sheath centerline; a hot junction within the sheath connecting the wires; and a layer of insulation separating the wires from each other and from the sheath.

28 Claims, 4 Drawing Sheets

SHEATHED THERMOCOUPLE WITH INTERNAL COILED WIRES

FIELD OF THE INVENTION

This invention relates to relatively elongated thermocouples and particularly to those encased in metal sheaths.

BACKGROUND OF THE INVENTION

Many thermocouples are encased in metal sheaths. Most are of short length. A few are elongated. "Elongated" as used herein means that the thermocouple has been mechanically lengthened by such means as extrusion, drawing, stretching or the like. This elongation introduces internal stresses which are typically used to compress ceramic insulation particles within the sheath into a more cohesive mass or to shape the thermocouple into some desired final configuration. Conventionally straight wires have been used for the different wires leading to the thermocouple junction. It has been known to form these leads of braided wire to relieve stresses caused by thermal expansion in sheathed thermocouples in high temperature applications, such as 3000° Fahrenheit. Where it is necessary to hold the thermocouple junction in direct contact with the surface to be measured, such as in situations where only limited heat transfer from the surface to thermocouple is desired, it has been known to form exposed coiled wire thermocouples for high resiliency. Breakage of encased thermocouple wires and junctions in applications where substantial thermocouple elongation occurs, such as roll-manufactured encased thermocouples is a significant concern.

SUMMARY OF THE INVENTION

It is in view of the above problems that the present invention was developed.

The invention thus has as an object to provide a thermocouple which can withstand elongation forces with substantially less likelihood of wire breakage or junction separation.

It is a further object to provide a thermocouple configuration which can be placed internally within an electrical heater.

It is a further object to provide a thermocouple within a rolled metal sheathed heater bar.

The above objects are achieved by providing a thermocouple comprising two wires of different materials, wherein the wires are coiled within the sheath. The coils are joined at a hot junction where an electromotive force is produced having a magnitude relative the temperature at that location. The coils provide enough resilience so that the hot junction does not break when the sheath is subjected to elongation forces.

BRIEF DESCRIPTION OF THE DRAWINGS

The advantages of this invention will be better understood by referring to the accompanying drawing, in which

FIG. 5 is a right, front, upper perspective view of a thermocouple rod using coiled wires in accordance with one embodiment the invention;

DESCRIPTION OF THE PREFERRED EMBODIMENTS

Figure 1:
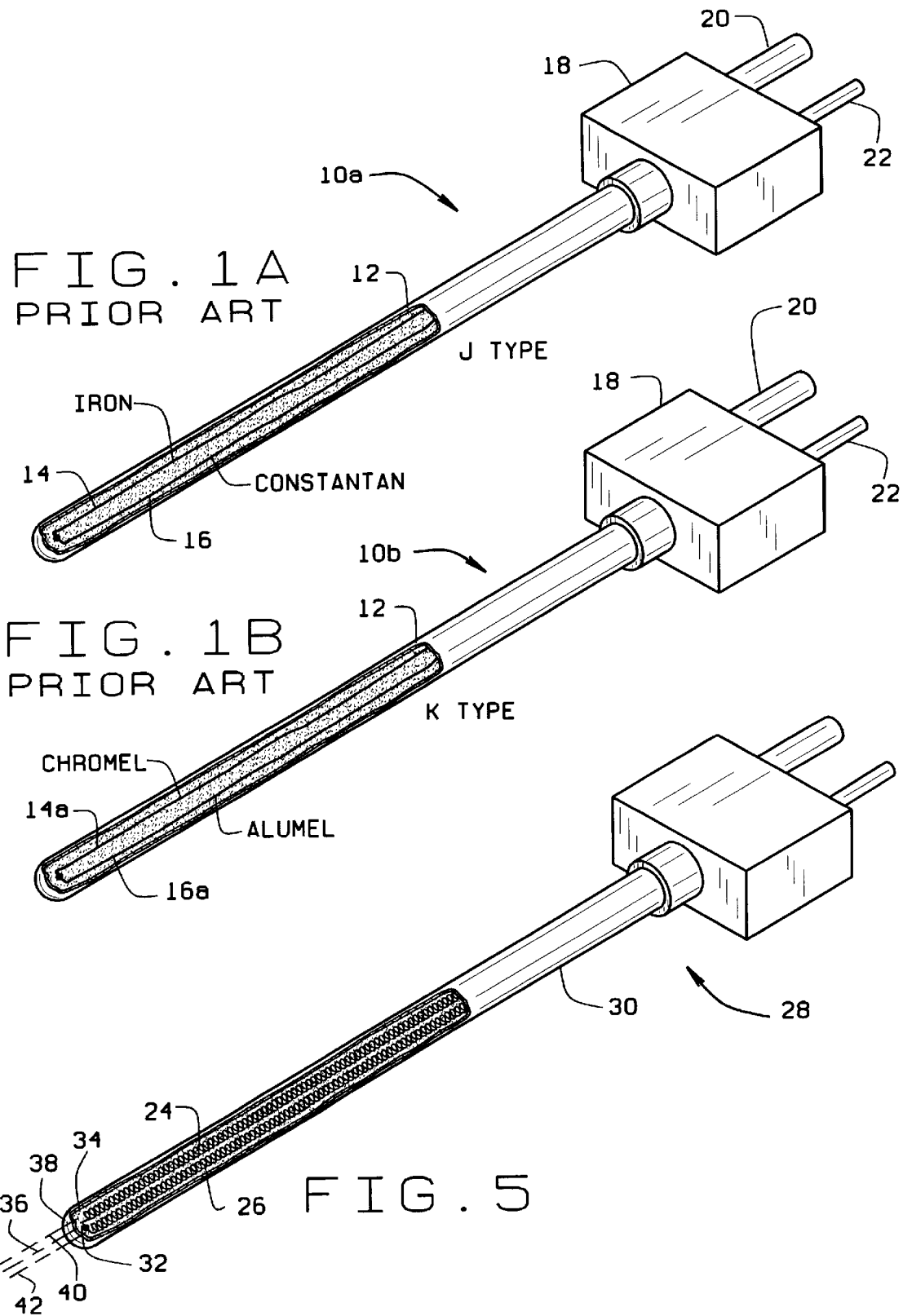
FIG. 1A is a right, front, upper perspective view of a prior art J-type thermocouple rod.
FIG. 1B is a right, front, upper perspective view of a prior art K-type thermocouple rod.

The general structure of prior rod type stand-alone thermocouples 10a, 10b is shown in FIGS. 1A & 1B. These thermocouples have an elongate metal sheath 12, a first straight wire 14,14a of iron or chromel and a second straight wire 16, 16a of constantan or alumel, respectively. Several other combinations of materials are known in the art to work as well. The wires 14, 14a, 16, 16a are spaced from the sheath and typically insulated by a mineral oxide, such as magnesium oxide (MgO). The wires are connected through a base 18 to leads 20,22.

Looking to FIG. 5 next, the invention can be seen in a basic form as substituting coiled wires 24,26 for straight wires 14, 14a, 16, 16a. FIG. 5 shows a thermocouple 28, which comprises a tubular metallic sheath 30, a first coiled wire 24, a second coiled wire 26, a hot junction 32 and an insulating layer 34. The sheath 30 is a cylindrical tube, which extends longitudinally about a sheath 30 centerline 36 and is closed at an end 38 adjacent the hot junction 32. The first wire 24 is of a first material, such as iron within the sheath and coiled about a first centerline 40 lying parallel to the sheath centerline 36. Second wire 26 of a second material, such as constantan, lies within the sheath and is coiled about a second centerline 42 lying parallel to the sheath centerline 36. Hot junction 32, lying within the sheath 30 adjacent closed end 38 connects the outer ends of the first and second wires 24,26 to provide the thermocouple effect. A layer of electrical insulation (but generally thermally conductive), typically a metal oxide such as magnesium oxide (MgO), separates the wires from each other and from the sheath. Suitable leads 20,22 and base 18 are provided in conventional manner to connect the thermocouple electrically to an instrument not shown.

Figure 2:
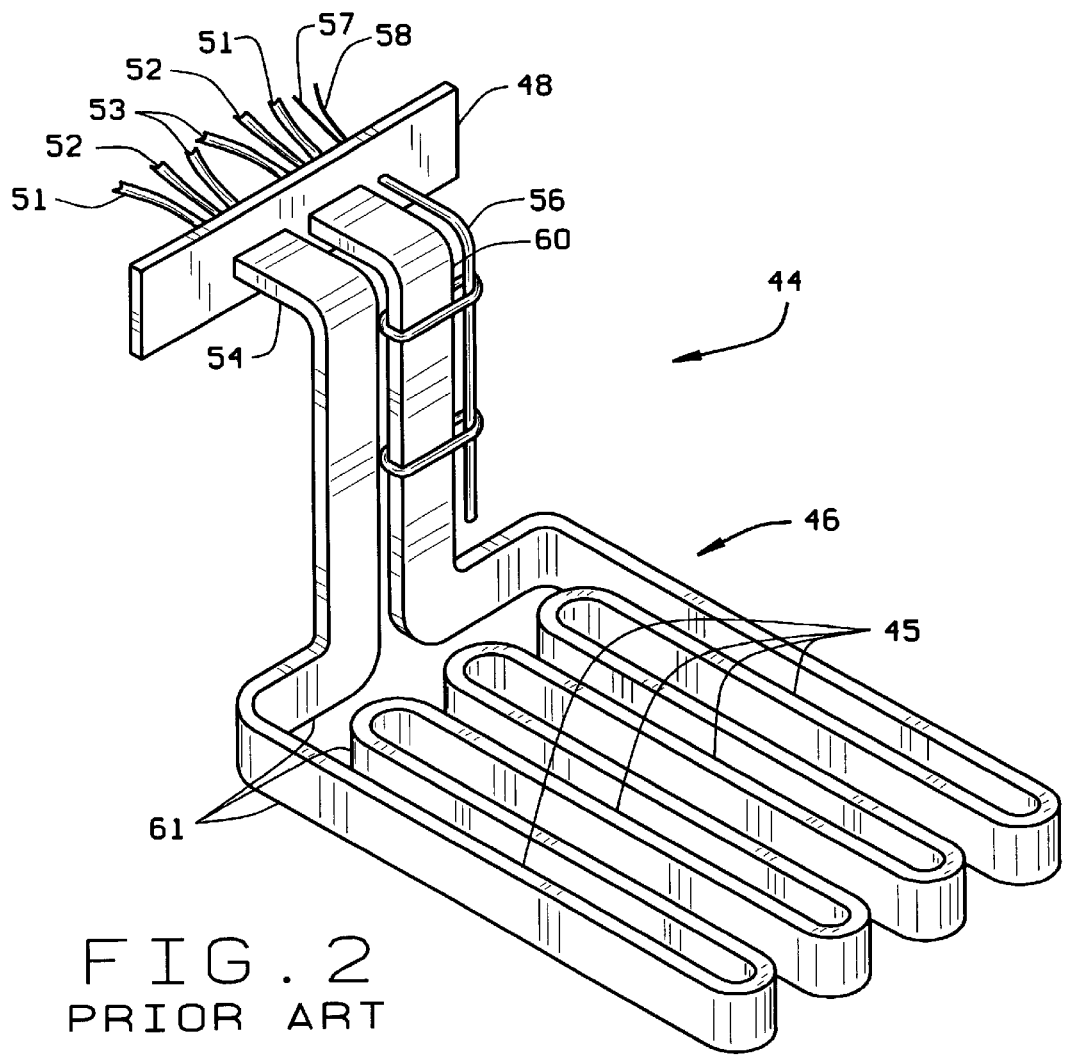
FIG. 2 is a left, front, upper perspective view of a prior art immersion heater and thermocouple unit, showing positioning of a thermocouple of the type shown in FIG. 1A or 1B, but downwardly bent.

Referring now to FIG. 2, a prior Firebar® flat immersion heater 44 of the type made by Watlow Electric Manufacturing Company of St. Louis, Mo. is shown. This type of heater 44 has a sinusoidal heater bar 46, which has three heater elements 51, 52, 53 within a metal sheath 54, as will be described below with reference to the improved version in FIG. 3 embodying the present invention. The heater bar 46 in this type of heater is mounted in a fryer or other heated device (not shown) by a mounting plate 48 and is connected to wires 51–53. A thermocouple 56, having two wires 57,58 is attached to one leg 60 of the heater 44 to measure the temperature of the fluid being heated adjacent to the heater 44. The heater bar 46 has flat sides 61 and is taller than it is wide and the heater wires 51–53 in the bar are aligned in a plane parallel to the sides of the bar 46. The unit has a thin horizontal dimension to allow more heated fluid to pass upwardly through the sinusoidal, or U-shaped portions 45 of the heater bar 46 and to allow debris to pass through the heating element more easily.

Figure 3:
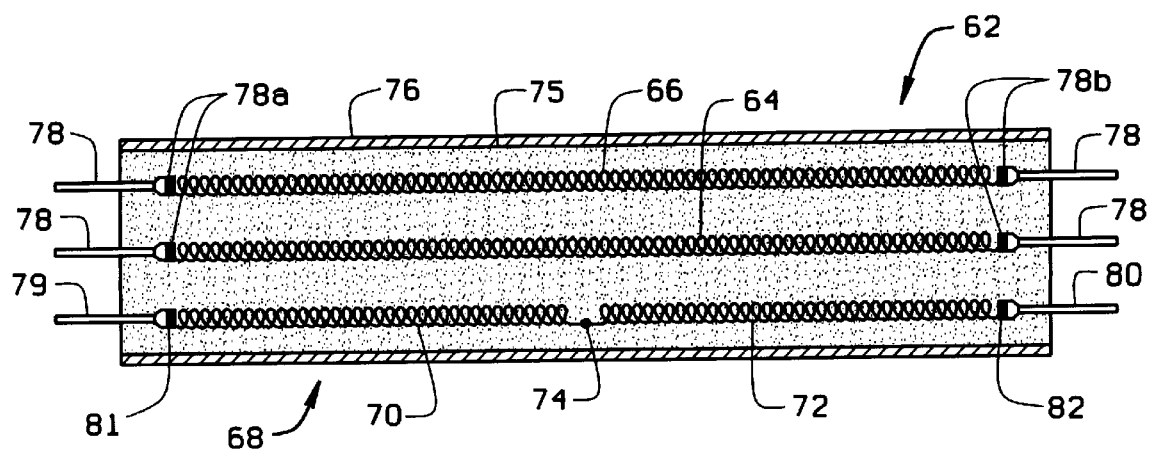
FIG. 3 is a vertical cross-sectional view of a sheathed combination heater and thermocouple in accordance with the invention.

Referring next to FIG. 3, the invention is shown as a modified heater bar 62 for heater unit configurations such as heater 44, except that the thermocouple 56 and thermocouple leads 57, 58 would be deleted and replaced by an internal thermocouple described below, and the mounting plate 48 could be modified accordingly. In that configuration, the sheath centerline has a plurality of U-shaped portions 45 lying in a common plane. Heater bar 62 has two coiled heating wires 64, 66 instead of three heater wires only as in the prior art device of FIG. 2. The third wire is replaced by a coiled thermocouple 68 having a first coiled wire 70 and a second coiled wire 72 lying end-to-end with a hot junction 74 therebetween to serve as a thermocouple. An insulation filler material 75 is placed between the wires 64, 66, 70, 72 and between the sheath 76 and the wires 64, 66, 70, 72. The first and second wires 70, 72 and the hot junction 74 all lie along a common centerline with the hot junction 74 between said first and second wires 70, 72. The heater bar 62 is surrounded by a metallic sheath 76 which has a flat vertical side 61 as in FIG. 2. The first and second wires 70, 72, as well as the heater wires 64, 66 all lie in a vertical plane parallel to the plane of that flat side. The heater bar 62 thus is essentially a thermocouple having one or more coiled heater wires 64, 66 within the same metallic sheath 76 and lying in the same plane as the first and second wires 70, 72. The heater wires 64, 66 lie above all first and second wires 70, 72, as is the case in FIG. 4, although this is not required. This placement of the heater wires above the thermocouple might be done to minimize damage to the thermocouples from the heat produced by the heater wires in some applications. Straight wire leads 78 are attached to the outer ends of the heater wires 64,66 at attachment points 78a,78b, respectively, disposed within the sheath 76. The leads 78 extend out of the sheath 76 from the attachment points 78a,78b so that the entire coiled portions of the heater wires 64,66 are within the sheath 76. Straight wire leads 79,80 are attached to the outer ends of the first and second wires 70, 72 at attachment points 81,82, respectively, disposed within the sheath 76, the leads 79, 80 extending out of the sheath from the attachment points 81, 82 so that the entire coiled portion of the thermocouple wires 70,72 is within said sheath 76. Such straight leads make electrical connections to heater bar 62 much easier. Lead 79 and wire 70 would be of the same material to prevent any thermocouple effect at the connection point 81 and lead 80 and wire 72 would be of the same material to prevent any thermocouple effect at the connection point 82. Although the hot junction 74 is shown located approximately equidistant between lead 79 and lead 80, it could be closer to one of the leads that the other, if desired.

Figure 4:
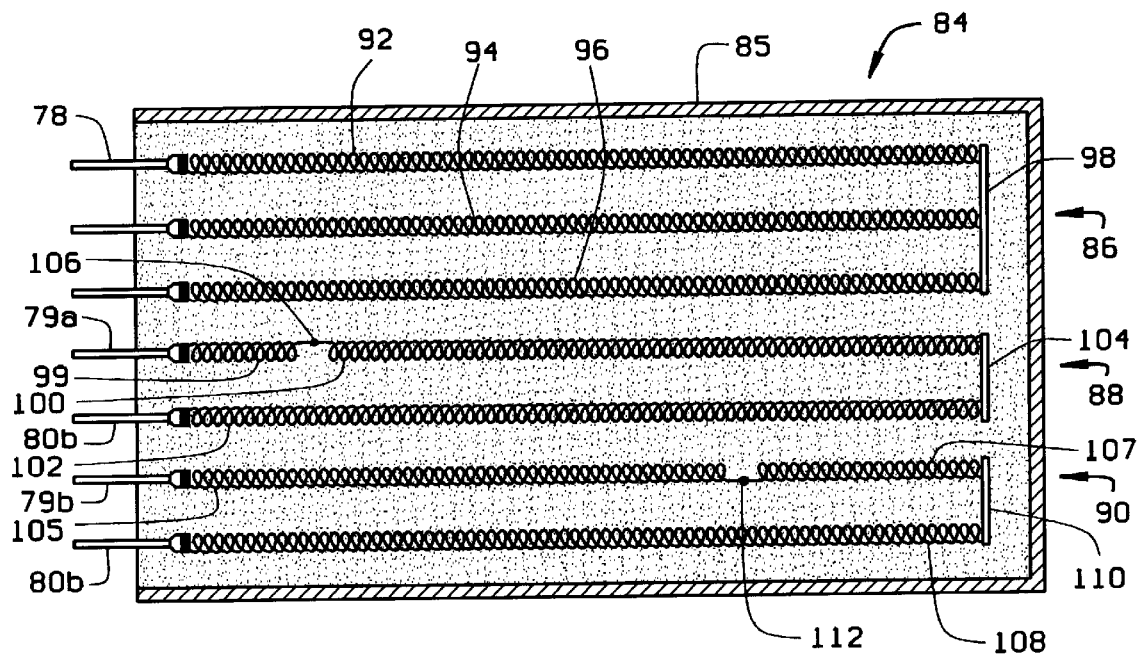
FIG. 4 is a vertical cross-sectional view of a modified combination heater and dual thermocouple in accordance with the invention.
Figure 7:
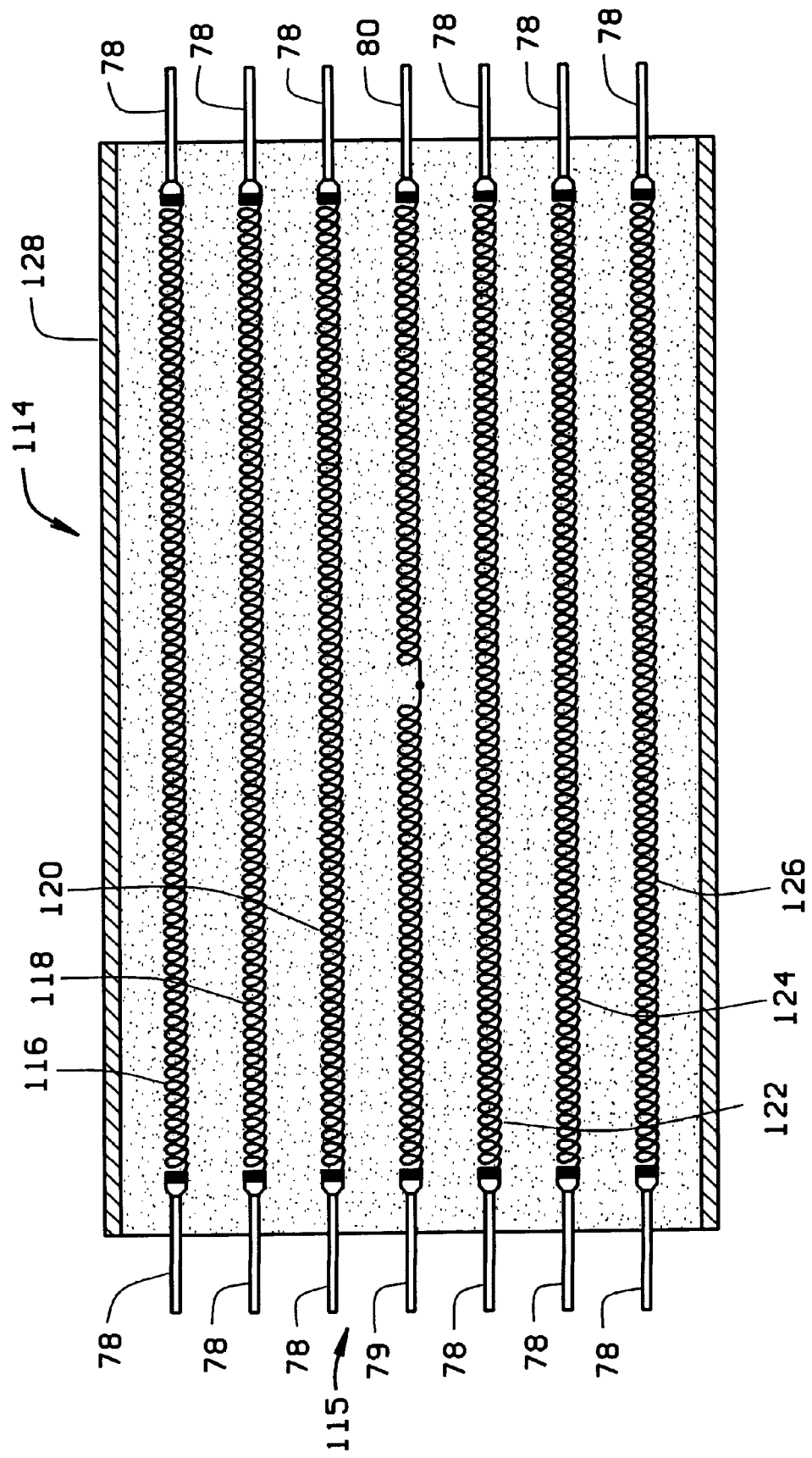
FIG. 7 is a vertical cross-sectional view of another modified combination heater and dual thermocouple in accordance with the invention.

Referring now to FIGS. 4 and 7, further modified bars 84 and 114 are shown, having seven wires. In the case of heater bar 84 in FIG. 4, all the wires are connected to leads projecting from the left end of a surrounding sheath 85 which encases the top, bottom and sides and the right end as shown. This can be called a "single-ended" configuration since all leads extend from a single end and the other end is encased by the metal sheath. In FIG. 7, the wires are connected to leads on both ends, as in FIG. 3, but there are more wires. The heater bar could also be provided with some of the wires single ended as in FIG. 4 and some through wired as in FIG. 3 and 7, although it would normally be easier to simply connect adjacent pins in a through-wired configuration than make such a hybrid configuration.

Referring again to FIG. 4, a heater bar 84 is shown wired in single-ended configuration having one three-wire heater 86 and two modified thermocouples 88, 90, although any suitable number could be used. That is, while seven wires are shown, more or less could be used, as desired. The three-wire heater 86 has three coiled wires 92, 94, 96 of suitable material such as nichrome connected at the right end by a suitable shunt 98. Two hot wires and one common ground wire would typically be used and this would be connected to a standard 220 volt current source through leads 78. Each of the first thermocouples 88 comprises three coiled wires 99, 100, 102, a straight shunt 104, a hot junction 106, and two straight wire or pin leads 79a, 80a. As in FIG. 3, the lead 79a would be composed of the same material, such as iron for a "J-type" thermocouple or chromel for a "K-type" thermocouple, as wire 99 and the lead 80a would be composed of the same material, such as constantan for a "J-type" thermocouple or alumel for a "K-type" thermocouple, as wire 100, wire 102 and shunt 104 to prevent any thermocouple effect at the connection of the wires 99, 100, 102 to the leads or shunt. Other pairs of materials are known in the art to work together as a thermocouple. Wire 99 is connected between a lead 79a and hot junction 106 and serves as the first side or "first wire" of the thermocouple 88, and wire 100, shunt 104 and lead 80a serve as the second side or "second wire" of the thermocouple 88. The bottom thermocouple 90, similarly has two leads 79b, 80b, three wires 105, 107, 108, a shunt 110 and a hot junction 112. Thermocouple 90 is constructed similarly to upper thermocouple 88 except that wire 105 is longer than wire 99 and wire 107 is shorter than wire 100, so that hot junction 112 lies to the right of and below hot junction 106. This allows temperature measurements at different locations on the heater bar 84. In the configuration of FIG. 4, wire 100 and 102 taken together with shunt 104 constitute a wire a which has one portion, wire 100, coiled about a common centerline with wire 99 and another portion, wire 102, which is coiled about a centerline lying parallel to and spaced from said common centerline, while the other wire 99 is coiled entirely about said common centerline. Likewise, in the configuration of FIG. 4, wire 107 and 108 taken together with shunt 110 constitute a wire a which has one portion, wire 107, coiled about a common centerline with wire 105 and another portion, wire 108, which is coiled about a centerline lying parallel to and spaced from said common centerline, while the other wire 105 is coiled entirely about said common centerline. When the modified bar of FIG. 3 or FIG. 4 is used in an immersion heater with a configuration like that shown in FIG. 2, the sheath centerline has a plurality of U-shaped portions, similar to portion 45 in FIG. 2, lying in a common plane and the plane of the flat sides is perpendicular to the plane of the U-shaped portions. However, since heater bar 84 has seven wires rather than three, it would be significantly higher. This has proven to provide greater efficiency to the bar.

Referring now to FIG. 7, a heater 114 is shown with leads at both ends of the seven wires, as in FIG. 3, rather than just one end. This would allow seven different functions to be provided in the seven different wires. Thus, for example there could as shown by way of example, be a central thermocouple 115 and three upper heater wires 116, 118, 120 and three lower heater wires 122, 124, 126, all in vertical alignment within a metal flat sided metal sheath 128, and that would allow for two heater circuits of three-phase, one below the thermocouple and one above. The heater wires are provided with leads 78 as in FIG. 3. The thermocouple is provided with leads 79, 80, wires 70, 72 and junction 74 as in FIG. 3, although these could be modified to locate junction 74 at a different point. If smart functions were desired, there could be multiple thermocouples with hot junctions at different locations. There could be any desired number of wires through the bar. As in FIG. 3, the heater is provided with straight wire leads, attached to ends of each of said first, second and heater wires at attachment points disposed within the sheath, said leads extending out of said sheath, the entire coiled portion of said wires being within said sheath.

The heater bar in FIGS. 3, 4 or 7 is an electrical heater with a tubular metallic sheath extending longitudinally about a horizontal sheath centerline, said sheath having a flat vertical side, said vertical side having a height greater than the horizontal transverse width of said sheath; a thermocouple within said sheath and including a first wire of a first material within said sheath and coiled about a first centerline lying parallel to said sheath centerline; a second wire of a second material within said sheath and coiled about a second centerline lying parallel to said sheath centerline and aligned in a vertical plane with said first wire; a hot junction within said sheath connecting said thermocouple wires and disposed in the same vertical plane as said thermocouple wires; a first heater wire within the sheath extending longitudinally parallel to said sheath centerline and above said thermocouple in said vertical plane; and a layer of mineral oxide insulating said wires from each other and from said sheath element. In addition, there is the second heater wire within the sheath extending longitudinally parallel to said sheath centerline and above said thermocouple in said vertical plane. In FIG. 4 there is a third heater wire within the sheath extending longitudinally parallel to said sheath centerline and above said thermocouple in said vertical plane in order to allow for a standard 220V three-wire power supply to the heater bar heating wires, although as noted above in FIG. 7 there can be two three-wire power supplies connected to the heater bar.

Figure 6:
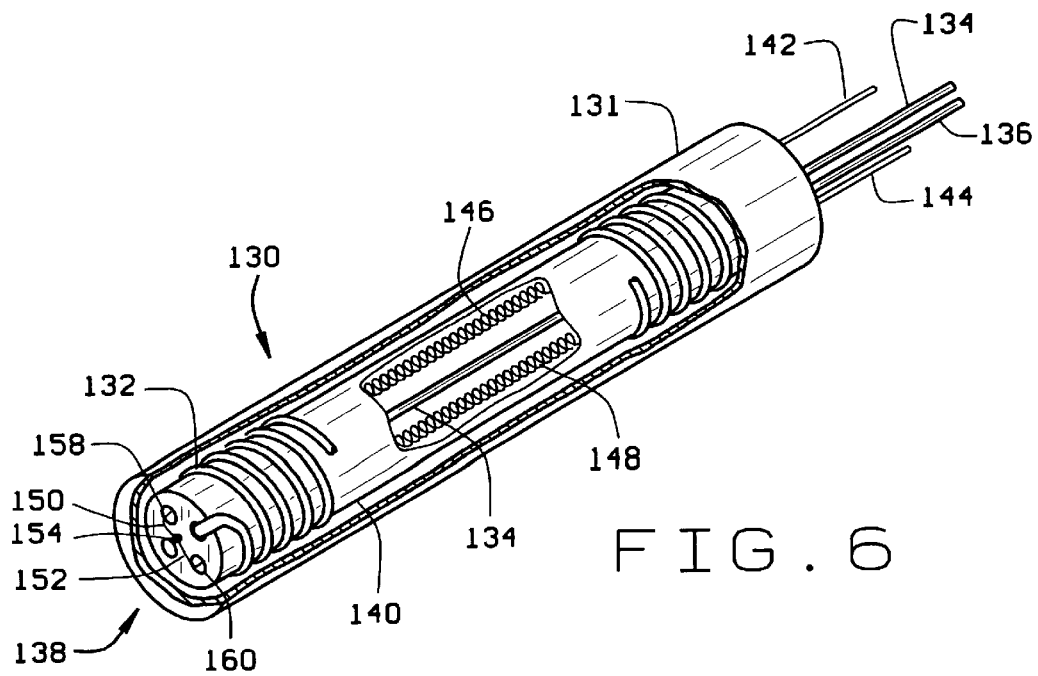
FIG. 6 is a right, front, upper perspective view of a combination heater/thermocouple rod in accordance with another embodiment of the invention.

Referring now to FIG. 6, a rod-type heater 130 is shown in partial cut-away. Heater 130 includes an outer metal sheath 131, a coiled heater wire 132, two heater leads 134, 136, a thermocouple 138, and an insulator 140. Thermocouple 138 includes a two straight lead 142, 144, two coiled wires 146, 148, two junction wires 150, 152 and a hot junction 154. The heater wire is coiled about the longitudinal axis and is wrapped around the outside of the insulator 140. The sheath is a closed-ended metal tube surrounding and spaced from the heater wire. The insulator 140 could be a rigid cylindrical ceramic insulator with longitudinal passageways 156, 158, 160 for one lead 134 and the two coiled thermocouple wires 146, 148, respectively. The coiled wires are connected by junction wires 150, 152 to welded hot junction 154 and by straight leads 142, 144 to any suitable external device. The passageways 156, 158, 160 and the annular space between sheath 131 and the heater wire 132 is filled with a suitable insulation fill material, such as a mineral oxide.

Having described the thermocouple of the invention structurally, the manufacture of the device will be briefly described. Except for the rod-type heater of FIG. 6, the a tubular sheath is preformed to an approximate shape. The wires are then inserted through the tube and place under tension to straighten them. The fill material is then added to electrically separate the wires from each other and the sheath. The assembled sheath, fill and wire are then roll-formed to the desired shape, maintaining the tension on the wires to keep them in position. Suitable leads are attached either before or after assembly. The heater rod of FIG. 6 would not be rolled, and the thermocouple wires would not need to be place under much tension. However, even there the invention might find application if tension was needed on the thermocouple wires during assembly or use. The simplicity of the invention allows such modifications within the scope of the invention.

In view of the foregoing, it will be seen that the stated objects of the invention are achieved. The above description explains the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description shall be interpreted as illustrative rather than limiting. Thus, the breadth and scope of the present invention should not be limited by any of the above-described exemplary embodiments, but should be defined only in accordance with the following claims appended hereto and their equivalents.

All patents, if any, referenced herein are incorporated in their entirety for purposes of background information and additional enablement.

What is claimed is:

1. A thermocouple comprising:
   a tubular metallic sheath extending longitudinally about a sheath centerline;
   a first single strand of non braided wire of a first material enclosed within said sheathr and helically coiled about a first centerline lying parallel to said sheath centerline;
   a second single strand of non braided wire of a second material enclosed within said sheath and helically coiled about a second centerline lying parallel to said sheath centerline;
   a hot junction enclosed within said sheath connecting said first and second wires; and
   a layer of insulation separating said first and second wires from each other and from said sheath.

2. The thermocouple of claim 1, wherein at least a portion of said first and second wires and said hot junction all lie along a common centerline with said hot junction between said first and second wires.

3. The thermocouple of claim 2, wherein one of said first and second wires has at least one supplemental portion which is coiled about a centerline lying parallel to and at a distance from said common centerline and wherein the other of said first and second wires is coiled entirely about said common centerline.

4. The thermocouple of claim 1, wherein said sheath has a flat side and said first and second wires lie in a plane parallel to the plane of that flat side.

5. The thermocouple of claim 4, wherein the sheath centerline has a plurality of U-shaped portions lying in a common plane.

6. The thermocouple of claim 4, further comprising a coiled heater wire within said metallic sheath and lying in the plane of said first and second wires.

7. The thermocouple of claim 6, wherein the heater wire lies entirely above said first and second wires.

8. The thermocouple of claim 1, further comprising straight wire leads coupled to ends of said first and second wire at points within said sheath and distal to said hot junction, said leads extending out of said sheath.

9. The thermocouple of claim 1, wherein the sheath centerline has a plurality of U-shaped portions lying in a common plane.

10. The thermocouple of claim 1, further comprising a coiled heater wire disposed within the said metallic sheath.

11. An electrical heater, comprising:
- a tubular metallic sheath extending longitudinally about a sheath centerline;
- a thermocouple entirely enclosed within said sheath and including
  - a first single strand of non-braided wire of a first material helically coiled about a first centerline lying parallel to said sheath centerline;
  - a second single strand of non-braided wire of a second material helically coiled about a second centerline lying parallel to said sheath centerline; and
  - a hot junction connecting said wires;
- a heater wire within said sheath extending longitudinally parallel to said sheath centerline; and
- a layer of insulation separating said wires from each other and from said sheath.

12. The heater of claim 11, wherein at least a portion of said first and second wires and said hot junction all lie along a common centerline with said hot junction between said first and second wires.

13. The heater of claim 12, wherein one of said first and second wires has at least one supplemental portion which is coiled about a centerline lying parallel to and at a distance from said common centerline and wherein the other of said first and second wires is coiled entirely about said common centerline.

14. The heater of claim 11, wherein said sheath has a flat side and said first and second wires and said heater wire all lie in a plane parallel to the plane of that flat side.

15. The heater of claim 14, wherein said sheath centerline has a plurality of U-shaped portions lying in a common plane.

16. The heater of claim 15, wherein the plane of the flat sides is perpendicular to the plane of the U-shaped portions.

17. The heater of claim 11, further comprising straight wire leads coupled to ends of each of said first, second and heater wires at attachment points disposed within the sheath, said leads extending out of said sheath.

18. The heater of claim 11, wherein said sheath centerline has a plurality of U-shaped portions lying in a common plane.

19. The heater of claim 11, further comprising a plurality of said coiled heater wires within said metallic sheath.

20. The heater of claim 11, further comprising a second coiled wire thermocouple within said metallic sheath.

21. The heater of claim 20, wherein said first, second, and heater wires all lie in a common plane within said sheath centerline.

22. The heater of claim 20, wherein said first and second thermocouple wires lie below the heater wires.

23. An electrical heater, comprising:
- a tubular metallic sheath extending longitudinally about a horizontal sheath centerline, said sheath having a flat vertical side, said vertical side having a height greater than the horizontal transverse width of said sheath;
- a thermocouple entirely enclosed within said sheath and including
  - a first single strand of non-braided wire of a first material helically coiled about a first centerline lying parallel to said sheath centerline;
  - a second single strand of non-braided wire of a second material helically coiled about a second centerline lying parallel to said sheath centerline and aligned in a vertical plane with said first wire; and
  - a hot junction connecting said thermocouple wires and disposed in the same vertical plane as said first and second thermocouple wires;
- a first heater wire within the sheath extending longitudinally parallel to said sheath centerline and lying in the same vertical plane as said thermocouple; and
- a layer of insulation separating said first and second thermocouple wires and said first heater wire from each other and from said sheath.

24. The heater of claim 23, further comprising a plurality of said heater wires within said sheath extending longitudinally parallel to said sheath centerline and above said thermocouple in the vertical plane of said thermocouple.

25. The heater of claim 24, having at least three said heater wires.

26. The heater of claim 25, further comprising a plurality of said thermocouples within said sheath extending longitudinally parallel to said sheath centerline.

27. A thermocouple, comprising:
- a tubular metallic sheath having greater height than width and extending longitudinally about a sheath centerline and having two flat sides and rounded top and bottom, all disposed symmetrically about a vertical plane;
- a first single strand of non-braided wire of the first material enclosed within said sheath and helically coiled about a first centerline lying parallel to said sheath centerline and in the vertical plane of said sheath;
- a second single strand of non-braided wire of a second material enclosed within said sheath and helically coiled about the a second centerline lying parallel to said sheath centerline and in the vertical plane of the said sheath;
- a hot junction enclosed within said sheath connecting said wires and lying in the vertical plane of said sheath; and
- a layer of insulation seperating said wires from each other in the vertical planes of said sheath and separating said wires laterally from said sheath, said insulation being disposed symmetrically with respect to said vertical plane.

28. The thermocouple of claim 27, further comprising a heater wire extending longitudinally parallel to and above said first and second wires and in the vertical plane of said sheath, said heater wire separated by said insulation from said first and second wires.

* * * * *